United States Patent
Berg et al.

(10) Patent No.: US 11,130,634 B1
(45) Date of Patent: Sep. 28, 2021

(54) REJECTION CHUTE FOR A CONVEYOR SYSTEM

(71) Applicant: Material Handling Systems, Inc., Mt. Washington, KY (US)

(72) Inventors: Nicholas A. Berg, Louisville, KY (US); Carl David Graston, Sellersburg, IN (US); Paul Receveur, New Albany, IN (US)

(73) Assignee: Material Handling Systems, Inc., Mt. Washington, KY (US)

( * ) Notice: Subject to any disclaimer, the term of this patent is extended or adjusted under 35 U.S.C. 154(b) by 0 days.

(21) Appl. No.: 16/913,509

(22) Filed: Jun. 26, 2020

Related U.S. Application Data

(60) Provisional application No. 62/867,443, filed on Jun. 27, 2019.

(51) Int. Cl.
*B65G 11/02* (2006.01)
*B65G 11/20* (2006.01)

(52) U.S. Cl.
CPC .......... *B65G 11/023* (2013.01); *B65G 11/203* (2013.01); *B65G 2201/0285* (2013.01)

(58) Field of Classification Search
None
See application file for complete search history.

(56) References Cited

U.S. PATENT DOCUMENTS

| | | | | |
|---|---|---|---|---|
| 4,984,676 A | * | 1/1991 | Michel | B07C 5/36 198/370.04 |
| 6,814,210 B1 | * | 11/2004 | Hendzel | B07C 3/08 193/8 |
| 9,969,554 B2 | * | 5/2018 | Hartmann | B65G 47/71 |
| 10,259,652 B1 | * | 4/2019 | Bisson | B65G 11/026 |
| 10,646,898 B2 | | 5/2020 | Hillerich, Jr. et al. | |

* cited by examiner

Primary Examiner — Kavel Singh
(74) Attorney, Agent, or Firm — Stites & Harbison, PLLC; David W. Nagle, Jr.

(57) ABSTRACT

A rejection chute for a conveyor system, which receives and redirects rejected parcels, includes: a conduit defined by a plurality of side walls; a door; and an actuator operably connected to the door. The conduit includes an enclosed upper portion defining a first opening for receiving parcels into the rejection chute and a lower portion defining a second opening for discharging parcels from the rejection chute. The door is mounted proximate to the first opening and is configured to transition between a first position to cover the first opening and a second position to uncover the first opening. The rejection chute can be integrated into a walking surface alongside of a conveyor to receive and redirect parcels transferred off of the conveyor to a location below the walking surface. An enclosure can be combined with the rejection chute to regulate access and guide parcels into the rejection chute.

10 Claims, 7 Drawing Sheets

REJECTION CHUTE FOR A CONVEYOR SYSTEM

CROSS-REFERENCE TO RELATED APPLICATIONS

The present application claims priority to U.S. Patent Application Ser. No. 62/867,443 filed on Jun. 27, 2019, the entire disclosure of which is incorporated herein by reference.

BACKGROUND OF THE INVENTION

The present invention relates to the handling of parcels within a sorting or similar facility. More particularly, the present invention relates to a rejection chute for receiving rejected parcels in a conveyor system.

In a sorting facility for parcels, various parcels are unloaded from trucks or other vehicles at unloading locations, sorted, and then loaded onto trucks or other vehicles at loading locations for delivery to the intended recipients. Thus, within the sorting facility, there is often a complex system of conveyors and equipment that facilitates transport and sorting of the various parcels within the facility.

When first introduced into the system of conveyors and equipment, the parcels are randomly positioned on a conveyor in a "bulk flow." Thus, within the sorting facility, the first step is often to transform the bulk flow into a singulated flow of parcels in which the parcels are positioned at substantially equal intervals and aligned (i.e., in a single file line) along a conveyor for subsequent processing. A wide variety of singulators exist in the art, many of which employ various combinations of belt conveyors and/or roller conveyors to achieve the desired singulation of the parcels. However, there are certain deficiencies in such prior art systems. For example, a surge in the volume of parcels may overwhelm the mechanical systems, and parcels may not be fully singulated. Non-singulated parcels may then interfere with subsequent processing, including downstream sorting.

With that in mind, U.S. Pat. No. 10,646,898, which is incorporated herein by reference, describes a system and method for identifying and transferring parcels from a bulk flow on a first conveyor to a singulated stream of parcels on a second conveyor. Specifically, a robot singulator (or robot) receives parcels via the first conveyor, engages each parcel, and then places it onto the second conveyor. In doing so, however, certain parcels may exceed size and/or weight limitations or otherwise may be characterized as "unconveyable." In such cases, a rejection chute may be utilized to move parcels from the primary conveyer system to a separate area for subsequent processing. To date, however, the use of such rejection chutes in a conveyer system have simply resulted in the incorporation of yet another chute positioned adjacent to, and extending laterally from, the primary conveyor system that, in turn, hinders the ability of an individual to walk unimpeded along a conveyor.

SUMMARY OF THE INVENTION

The present invention is a rejection chute for a conveyor system, which receives and redirects rejected parcels for subsequent processing.

A rejection chute for a conveyor system generally includes: a conduit defined by a plurality of side walls; a door; and an actuator operably connected to the door. The conduit includes an enclosed upper portion defining a first opening for receiving parcels into the rejection chute and a lower portion defining a second opening for discharging parcels from the rejection chute. The door is mounted proximate to the first opening and is configured transition between a first (closed) position to cover the first opening and a second (open) position to uncover the first opening to, respectively, restrict and permit entry of parcels into the rejection chute.

In some embodiments, at least one side wall of the conduit of the rejection chute curves as the side wall extends from the enclosed upper portion to the lower portion of the conduit to discharge parcels in a direction substantially perpendicular to the direction in which the parcels are initially received into the rejection chute. In such embodiments, the rejection chute is thus able to direct parcels to an intended destination, even if the intended destination is not positioned directly below the rejection chute. In other embodiments, each side wall defining the conduit extends linearly (i.e., does not curve) and is of a reduced length to facilitate installation of the rejection chute in environments where clearance for the rejection chute is limited.

In some implementations, the rejection chute is positioned alongside of a conveyor to receive and redirect parcels which are identified for rejection and transferred off of the conveyor to an intended destination for subsequent processing. In this way, the rejection chute can thus be utilized in conjunction with a conveyor to provide an improved conveyor system for processing and sorting parcels.

In some implementations, the rejection chute is integrated into a walking surface positioned alongside of the conveyor, such that parcels transferred to the rejection chute are discharged from the rejection chute below the walking surface. Thus, instead of extending outwardly from the conveyor and directing parcels in a primarily lateral direction like rejection chutes of known construction, the rejection chute of the present invention can be implemented to direct parcels in a primarily vertical direction without direct contact with the conveyor. In this way, the rejection chute thus occupies less area around the conveyor, thereby better enabling individuals to walk unimpeded alongside of the conveyor. Preferably, the rejection chute is integrated into the walking surface, such that the door of the rejection chute is positioned along substantially the same plane as the walking surface when in the first (closed) position.

In some implementations, the conveyor system further includes an enclosure that is positioned on top of the rejection chute to provide a physical barrier which may be selectively manipulated to restrict or provide access to the rejection chute. The enclosure is defined by a first side wall, a second side wall, a first gate, and a second gate. The first gate and the second gate of the enclosure are each pivotally mounted to one of the side walls of the enclosure by a hinge, such that the first gate and the second gate are also configured to transition between a first closed position and an open position. When the first gate and the second gate are both in the closed position, the enclosure completely surrounds and restricts access to the rejection chute. Conversely, when the first gate and the second gate of the enclosure are in the open position the rejection chute is accessible. In addition to regulating access to the restriction chute, the enclosure also helps to guide parcels identified for rejection into the rejection chute as they are transferred from the conveyor.

In some implementations, the conveyor system can further include a transfer mechanism for transferring parcels identified for rejection from the conveyor to the rejection chute, a transfer chute extending from the conveyor to the enclosure, an additional conveyor, and/or a control subsystem which regulates certain operations of one or more components of the conveyor system.

DETAILED DESCRIPTION OF THE INVENTION

The present invention is a rejection chute for a conveyor system, which receives and redirects rejected parcels for subsequent processing.

Figure 1A:
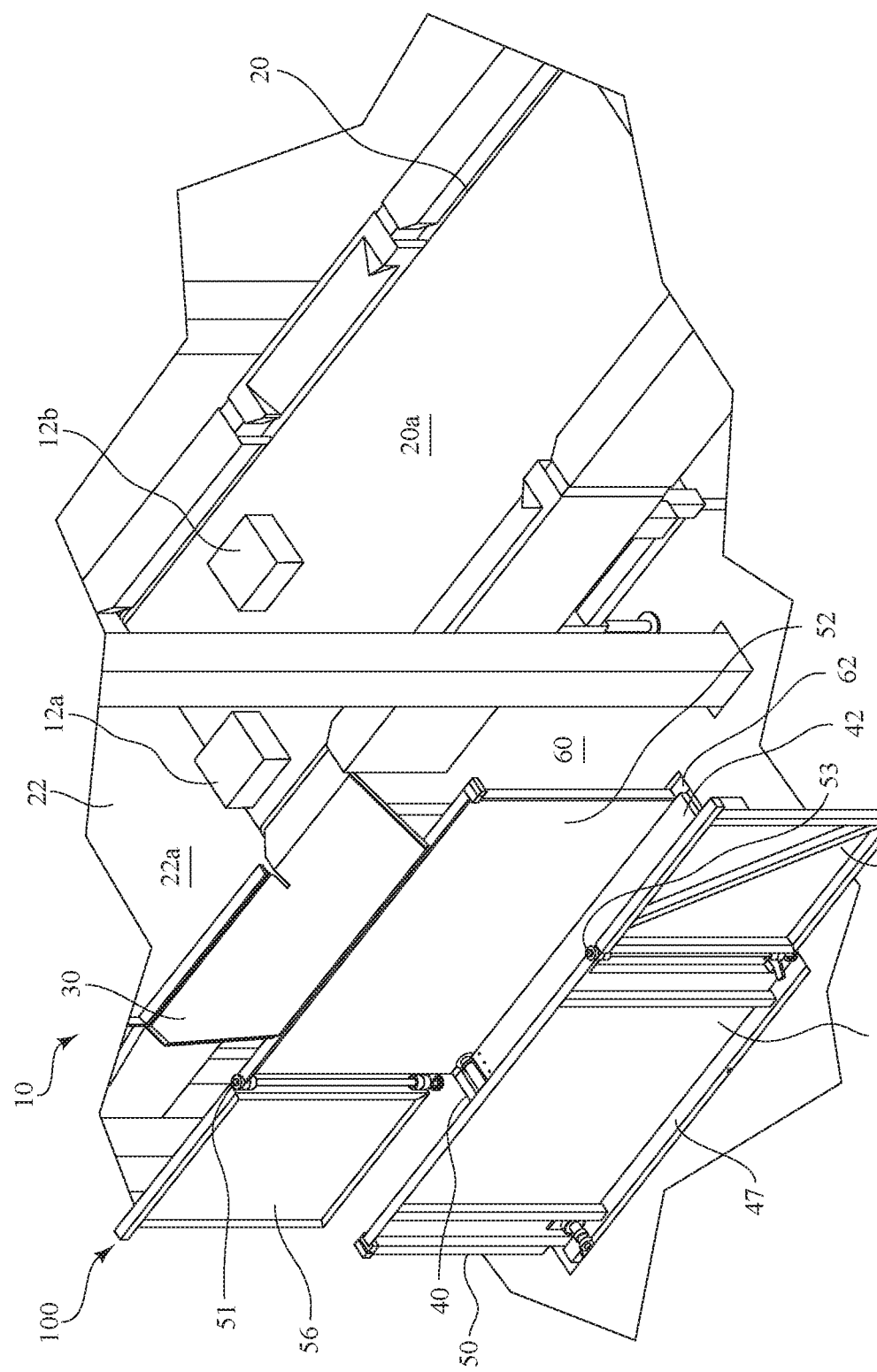
FIG. 1A is a partial perspective view of a conveyor system including an exemplary rejection chute and enclosure made in accordance with the present invention, with a door of the exemplary rejection chute in a first (closed) position.
Figure 1B:
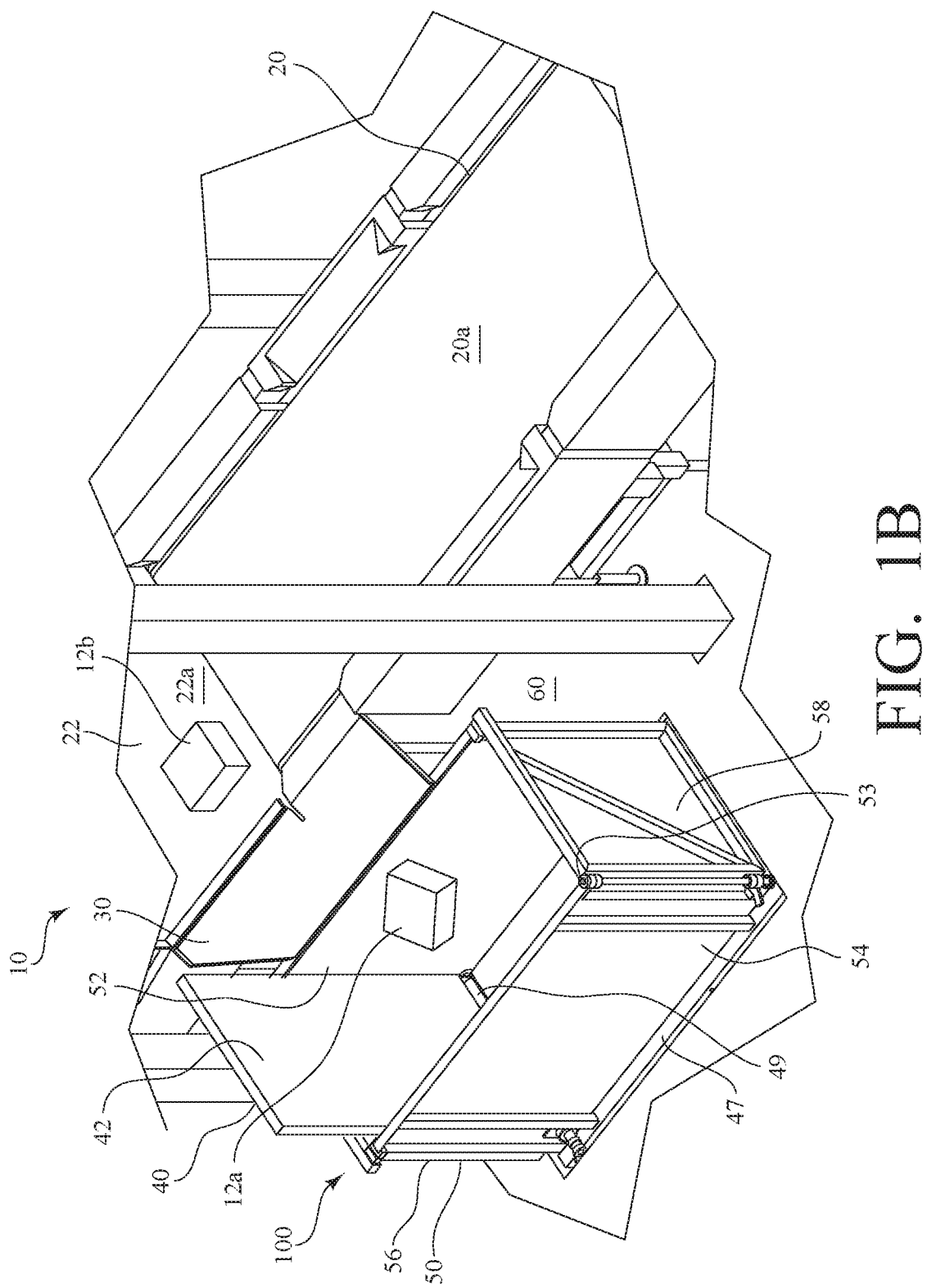
FIG. 1B is a partial perspective view similar to FIG. 1A, but with the door of the exemplary rejection chute in a second (open) position.

FIGS. 1A and 1B are partial perspective views of a conveyor system 10 for sorting a bulk flow of parcels. Two parcels are shown and identified by reference numbers 12a and 12b; of course, in practice, a large volume of parcels would be handled by the conveyor system 10. The conveyor system 10 includes a first conveyor 20 having a conveying surface 20a for transporting the bulk flow of parcels and a second conveyor 22 located downstream of the first conveyor 20 and having a conveying surface 22a for further transporting the parcels. Furthermore, the conveyor system 10 also includes an exemplary rejection chute 40 made in accordance with the present invention.

Referring still to FIGS. 1A and 1B, the rejection chute 40 is positioned within the conveyor system 10 relative to the first conveyor 20 and the second conveyor 22, such that any parcel 12a, 12b identified to exhibit a predefined characteristic (e.g., certain dimensions or shape) that signifies the parcel 12a, 12b is "unconveyable," such parcel 12a, 12b can be readily transferred to the rejection chute 40 and redirected for subsequent processing. Specifically, in this exemplary implementation and as further described below, the rejection chute 40 is positioned adjacent to the first conveyor 20 and the second conveyor 22 to receive parcels which are identified for rejection and transferred off of the conveying surface 20a of the first conveyor 20 and/or the conveying surface 22a of the second conveyor 22. Parcels which are identified for rejection are transferred by a transfer mechanism 70 (FIG. 4), which is configured to move such parcels from the first conveyor 20 and/or the second conveyor 22 to the rejection chute 40. In some implementations, the transfer mechanism 70 is a robot singulator, such as the robot singulator described in U.S. Pat. No. 10,646,898, which, again, is incorporated herein by reference. In other embodiments, the transfer mechanism 70 is a separate rejection mechanism, such as one of the rejection mechanisms described in co-pending and commonly assigned U.S. patent application Ser. No. 16/887,286, which is also incorporated herein by reference.

Referring still to FIGS. 1A and 1B, in this exemplary implementation, the conveyor system 10 further includes an enclosure 50 surrounding the rejection chute 40 and a transfer chute 30 extending from an edge of the first conveyor 20 and the second conveyor 22 to the enclosure 50 to help guide parcels identified for rejection into the rejection chute 40.

Referring still to FIGS. 1A and 1B, the exemplary rejection chute 40 includes a door 42 that is configured to transition between: a first (closed) position, as shown in FIG. 1A; and a second (open) position, as shown in FIG. 1B. As evidenced by viewing FIGS. 1A and 1B in sequence, once a parcel 12a is identified for rejection, the door 42 of the rejection chute 40 is transitioned from the first (closed) position to the second (open) position to accept the parcel 12a as it is transferred off of the first conveyor 20 and/or second conveyor 22. In this exemplary implementation, the rejection chute 40 is integrated into a walking surface 60 alongside the first conveyor 20 and the second conveyor 22, as further described below. As such, the door 42 is preferably maintained in the first (closed) position to prevent individuals walking alongside the first conveyor 20 and/or second conveyor 22 from falling into the rejection chute 40. Furthermore, to this end, in this exemplary implementation, the enclosure 50 is positioned on top of the rejection chute 40 to provide a physical barrier around the rejection chute 40 which can be manipulated to either restrict or provide access to the rejection chute 40, as further described below.

Referring still to FIGS. 1A and 1B, following receipt of the parcel 12a identified for rejection, the parcel 12a is redirected by the rejection chute 40 to an intended destination, such as another conveyor or bin positioned below the walking surface 60, for subsequent processing, and the door 42 of the rejection chute 40 is returned to the first (closed) position. As further described below with reference to FIG. 4, operation of the first conveyor 20, the second conveyor 22, the door 42 of the rejection chute 40, and the transfer mechanism 70 are, in at least some implementations, regulated by a control subsystem 300.

Figure 2A:
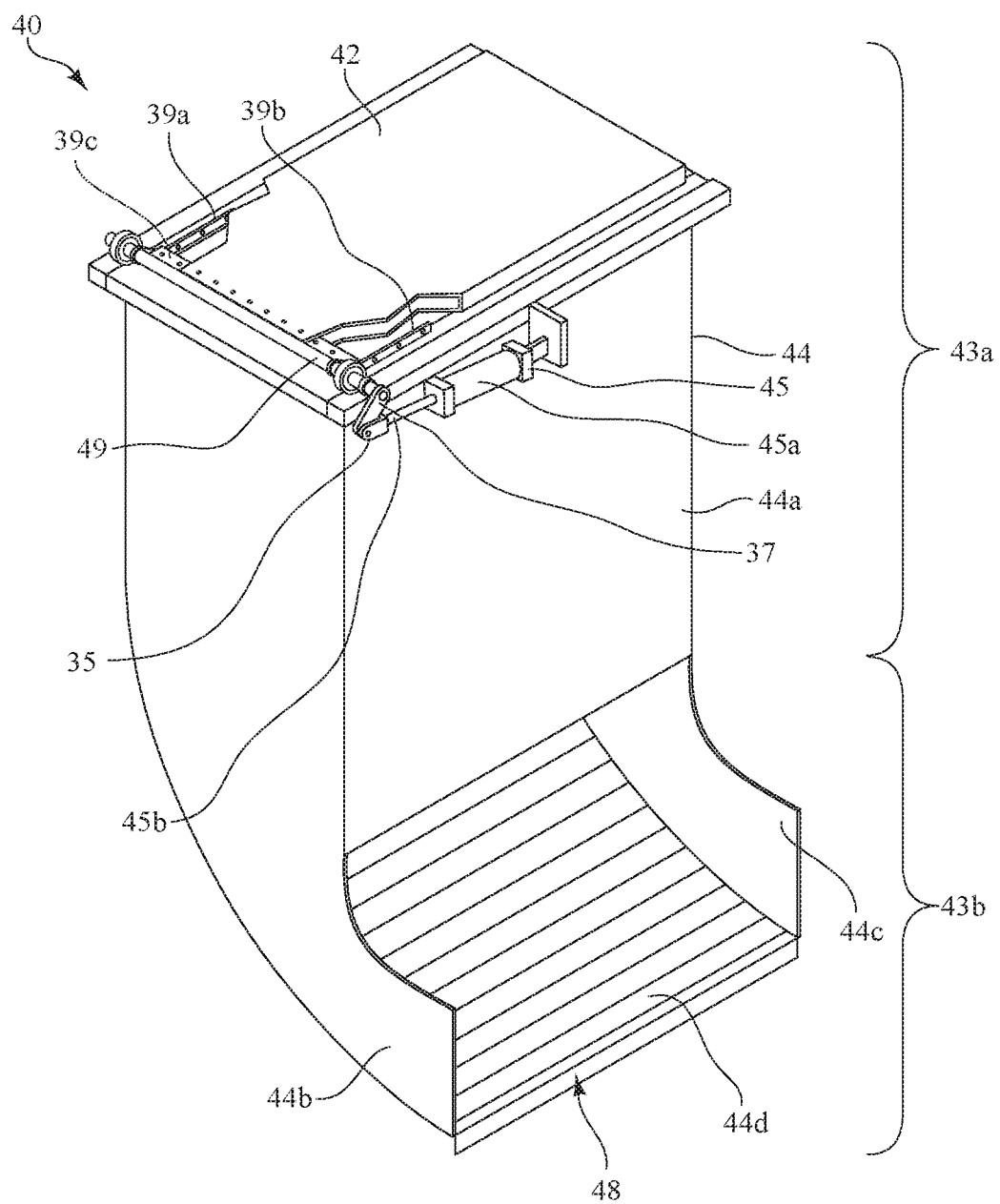
FIG. 2A is a perspective view of the exemplary rejection chute of FIG. 1A, with the door of the exemplary rejection chute in the first (closed) position and portions of the door removed to better illustrate certain components of the exemplary rejection chute.
Figure 2B:
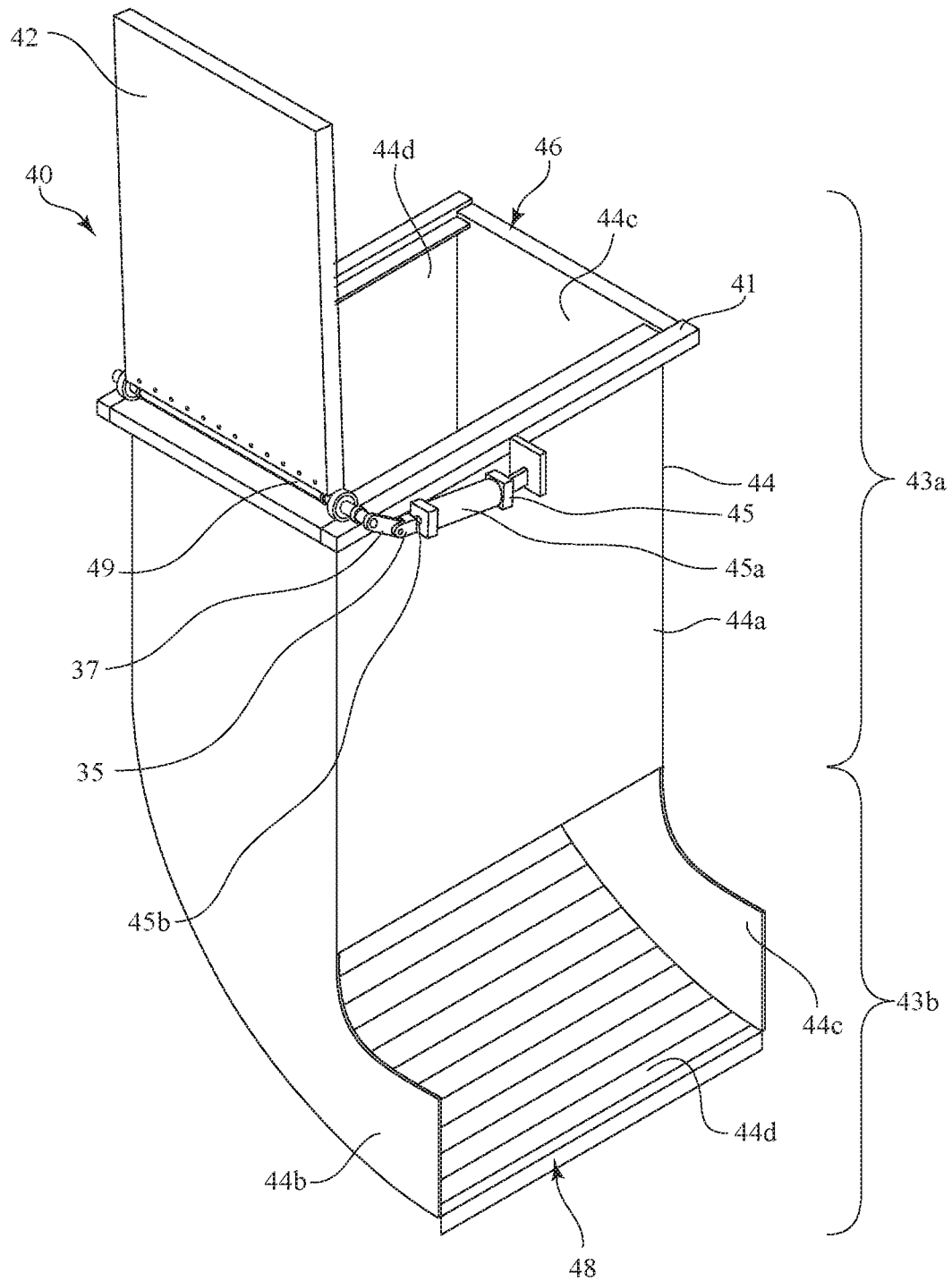
FIG. 2B is a perspective view similar to FIG. 2A, but with the door of the exemplary rejection chute in the second (open) position.

FIGS. 2A and 2B are perspective views of the exemplary rejection chute 40 in isolation from the other components of the conveyor system 10. In FIG. 2A, portions of the door 42 are removed to better illustrate certain components of the exemplary rejection chute 40.

Referring now to 2A and 2B, the rejection chute 40 generally includes: a conduit 44, which guides parcels transferred off of the first conveyor 20 and/or the second conveyor 22 to an intended destination; the door 42, which, as noted above, is configured to transition between a first (closed) and a second (open) position relative to the conduit 44; and an actuator 45 that is operably connected to and is configured to transition the door 42 between the first (closed) and the second or (open) position. The conduit 44 is defined by and can be characterized as including: an upper portion 43a that defines a first opening 46 for receiving parcels into the rejection chute 40 and a lower portion 43b that defines a second opening 48 for discharging parcels from the rejection chute 40. In this exemplary embodiment, the conduit 44 includes four sidewalls: a first side wall 44a;

a second side wall 44b; a third side wall 44c; and a fourth side wall 44d. The first side wall 44a, the second side wall 44b, the third side wall 44c, and the fourth side wall 44d collectively define the upper portion 43a of the conduit 44, which, in this case, is fully enclosed. In this embodiment, the first side wall 44a is of a shorter length than the other side walls 44b, 44c, 44d, such that the lower portion 43b of the conduit 44 is only defined by the second side wall 44b, the third side wall 44c, and the fourth side wall 44d. Thus, in this exemplary embodiment, one side of the lower portion 43b of the conduit 44 is left open, and the lower portion 43b of the conduit 44 is only partially enclosed (i.e., the lower portion 43b is not defined by all four side walls 44a, 44b, 44c, 44d).

Referring still to FIGS. 2A and 2B, in this exemplary embodiment, the rejection chute 40 is configured to redirect a parcel as it passes through the conduit 44. Specifically, in this exemplary embodiment, the parcel travels under the force of gravity from the first opening 46 to the second opening 48. Furthermore, the fourth side wall 44d is curved, transitioning from a substantially vertical orientation in the upper portion 43a of the conduit 44 to a substantially horizontal orientation in the lower portion 43b of the conduit 44. In other words, parcels passing through the rejection chute 40 are discharged from the rejection chute 40 through the second opening 48 in a direction that is substantially perpendicular to the direction in which such parcels initially entered the rejection chute 40 through the first opening 46. In this way, the rejection chute 40 may be utilized to redirect parcels identified for rejection to an intended destination, such as another conveyor or bin, even if the intended destination is not directly positioned below the rejection chute 40. Of course the design and shape of the side walls 44a, 44b, 44c, 44d defining the conduit 44 can be tailored to accommodate a specific application or environment, as evidenced by the exemplary rejection chute 140 illustrated in FIGS. 3A and 3B and further described below.

Referring again to FIGS. 1A, 1B, 2A, and 2B, the door 42 is mounted proximate to the first opening 46 defined by the upper portion 43a of the conduit 44, such that the first opening 46 is effectively covered by the door 42 when the door 42 is in the first (closed) position (as shown in FIGS. 1A and 2A) and is uncovered when the door 42 is in the second (open) position (as shown in FIGS. 1B and 2B). Preferably, the door 42 is sized and shaped as to cover the entirety of the first opening 46. In this exemplary embodiment, to transition the door 42 between the first (closed) position and the second (open) position, the door 42 is mounted for pivotal movement with respect to the first opening 46 defined by the upper portion 43a of the conduit 44. In this regard, the door 42 is mounted to a shaft 49. Specifically, in this exemplary embodiment, the door 42 is mounted to the shaft 49 via two lifting arms 39a, 39b, and a plate 39c, as shown best in FIG. 2A. The two lifting arms 39a, 39b and plate 39c, in turn, are mounted to the shaft 49, such that, as the shaft 49 rotates, the two lifting arms 39a, 39b and plate 39c also rotate. Thus, rotation of the shaft 49 transitions the door 42 between the first (closed) position and the second (open) position, with the shaft 49 effectively defining the axis of rotation.

Referring now again to FIGS. 2A and 2B, the shaft 49 is operably connected to and is rotated by an actuator 45. In this exemplary embodiment, the actuator 45 is a motor-controlled linear actuator having a cylinder 45a and an arm 45b which can be extended and retracted to manipulate to cause rotation of the shaft 49, and thus transition of the door 42 between the first (closed) position and the second (open) position. Specifically, in this exemplary embodiment, the shaft 49 is operably connected to the actuator 45 by a linkage assembly comprised of a first linkage 35 and a second linkage 37. A proximal end of the first linkage 35 is connected to a distal end of the arm 45b of the actuator 45, and a distal end of the first linkage 35 is pivotally connected to a proximal end of the second linkage 37. A distal end of the second linkage 37 is then connected to the shaft 49. As evidenced by viewing FIGS. 2A and 2B in sequence, as the arm 45b is retracted into cylinder 45a of the actuator, the first linkage 35 pulls the proximal end of the second linkage 37 toward the actuator 45, thus effectively applying a torque which causes the second linkage 37, and thus, the shaft 49, to rotate in a first direction (e.g., counter-clockwise in FIGS. 2A and 2B) to raise the door 42 to the second (open) position, thereby uncovering the first opening 46. Conversely, as the arm 45b is extended out of the cylinder 45a, the first linkage 35 pushes the proximal end of the second linkage 37 away from the actuator 45, thus effectively applying a torque which causes the shaft 49 to rotate in a second direction (e.g., clockwise in FIGS. 2A and 2B) to lower the door 42 to the second (closed) position, thereby covering the first opening 46. Of course, this is but one example of an actuator that could be used to transition of the door 42 between the first (closed) position and the second (open) position. Various other hydraulic or pneumatic actuators may alternatively be used while still enabling the rejection chute 40 to function in the manner described herein.

Referring now again to FIGS. 1A and 1B, in this exemplary implementation, the rejection chute 40 is positioned within an opening 62 defined by, and thus can be characterized as integrated into, the walking surface 60 alongside of the first conveyor 20 and the second conveyor 22. As a result, parcels transferred into the rejection chute 40 are subsequently discharged from the rejection chute 40 below the walking surface 60. Thus, unlike conventional rejection chutes, which guide parcels to an intended destination along a primarily lateral pathway extending outwardly from the conveyor(s) of a conveyor system, the exemplary rejection chute 40 guides parcels to an intended destination along a primarily vertical pathway and does not extend outwardly from the first and second conveyors 20, 22 of the conveyor system 10. In this way, the exemplary rejection chute 40 occupies less space around the first conveyor 20 and the second conveyor 22 and, thus, better enables individuals to walk unimpeded alongside of the first conveyor 20 and the second conveyor 22 of the conveyor system 10 as compared to rejection chutes of known construction.

Referring still to FIGS. 1A and 1B, in this exemplary implementation, the rejection chute 40 is positioned relative to the walking surface 60, such that the door 42, when in the first (closed) position, is positioned along substantially the same plane as the walking surface 60, and the second opening 48 defined by the lower portion 43b of the conduit 44 is positioned below the walking surface 60. Since the walking surface 60 is located at a lower position than the conveying surfaces 20a, 22a of the first and second conveyors 20, 22, the first opening 46 defined by the upper portion 43a of the conduit 44 is also located at a lower position than the conveying surfaces 20a, 22a of the first and second conveyor 20, 22. In this exemplary implementation, the rejection chute 40 is mounted to the walking surface 60 via one or more brackets 47, though or other suitable fastener means may alternatively be used. Furthermore, in this exemplary implementation, the rejection chute 40 is mounted to the walking surface 60 such that the door 42, when in the first (closed) position, is positioned within or proximate to an opening 62 defined by the walking surface 60. Accordingly, when the door 42 is in the first (closed) position, the opening 62 defined by the walking surface 60 is substantially filled, thus permitting individuals to walk across the opening 62 without risk of falling through the opening 62 defined thereby or into the rejection chute 40. Conversely, when the door 42 is in the second (open) position, the opening 62 defined by the walking surface 60 is not substantially filled. As noted above, it is therefore generally preferred that the door 42 of the rejection chute 40 be maintained in the first (closed) position if and until parcels are identified for rejection.

Referring still to FIGS. 1A and 1B, to reduce the risk of individuals falling into the rejection chute 40, in this exemplary implementation, the enclosure 50 is positioned on top of the rejection chute 40 to provide a physical barrier which may be selectively manipulated to restrict or provide access to the rejection chute 40. As shown in FIGS. 1A and 1B, the enclosure 50 is defined by a first side wall 52, a second side wall 54, a first gate 56, and a second gate 58. The first side wall 52 is positioned on a first side of the rejection chute 40, and the second side wall 54 is positioned opposite of the first side wall 52 on a second side of the rejection chute 40. The first gate 56 is pivotally mounted to the first side wall 52 of the enclosure 50 by a first hinge 51 and the second gate 58 is pivotally mounted to the second side wall 54 of the enclosure 50 by a second hinge 53, such that the first gate 56 and the second gate 58 of the enclosure 50 are each also configured to transition between: a closed position, as shown in FIG. 1B; and an open position, as shown in FIG. 1A.

When the first gate 56 and the second gate 58 are closed, the enclosure 50 completely surrounds and restricts access to the rejection chute 40 (FIG. 1B), thus preventing an individual from inadvertently falling into the rejection chute 40 when the door 42 is in the second (open) position. However, when both the first gate 56 and the second gate 58 are open, and the door 42 is in the first (closed) position covering the first opening 46 (FIG. 1A), the first gate 56, the second gate 58, and the door 42 effectively create a walled pathway across the opening 62 defined by the walking surface 60. Furthermore, as the enclosure 50 completely surrounds the first opening 46 of the rejection chute 40 when the first gate 56 and the second gate 58 are closed, the enclosure 50 also helps to ensure parcels identified for rejection and transferred off of the first conveyor 20 and/or the second conveyor 22 by the transfer mechanism 70 (FIG. 4) are directed into the rejection chute 40 and are prevented from accumulating on the walking surface 60. In this regard, in addition to serving as a safety barrier, the enclosure 50 also provides a guide for directing parcels identified for rejection into the rejection chute 40. As evidenced by the foregoing, the rejection chute 40 and the enclosure 50, in combination, thus form, and can be referred to as, an assembly 100 which effectively directs parcels identified for rejection to an intended destination without significantly impeding the ability of an individual to travel alongside the first conveyor 20 and/or the second conveyor 22.

Figure 3A:
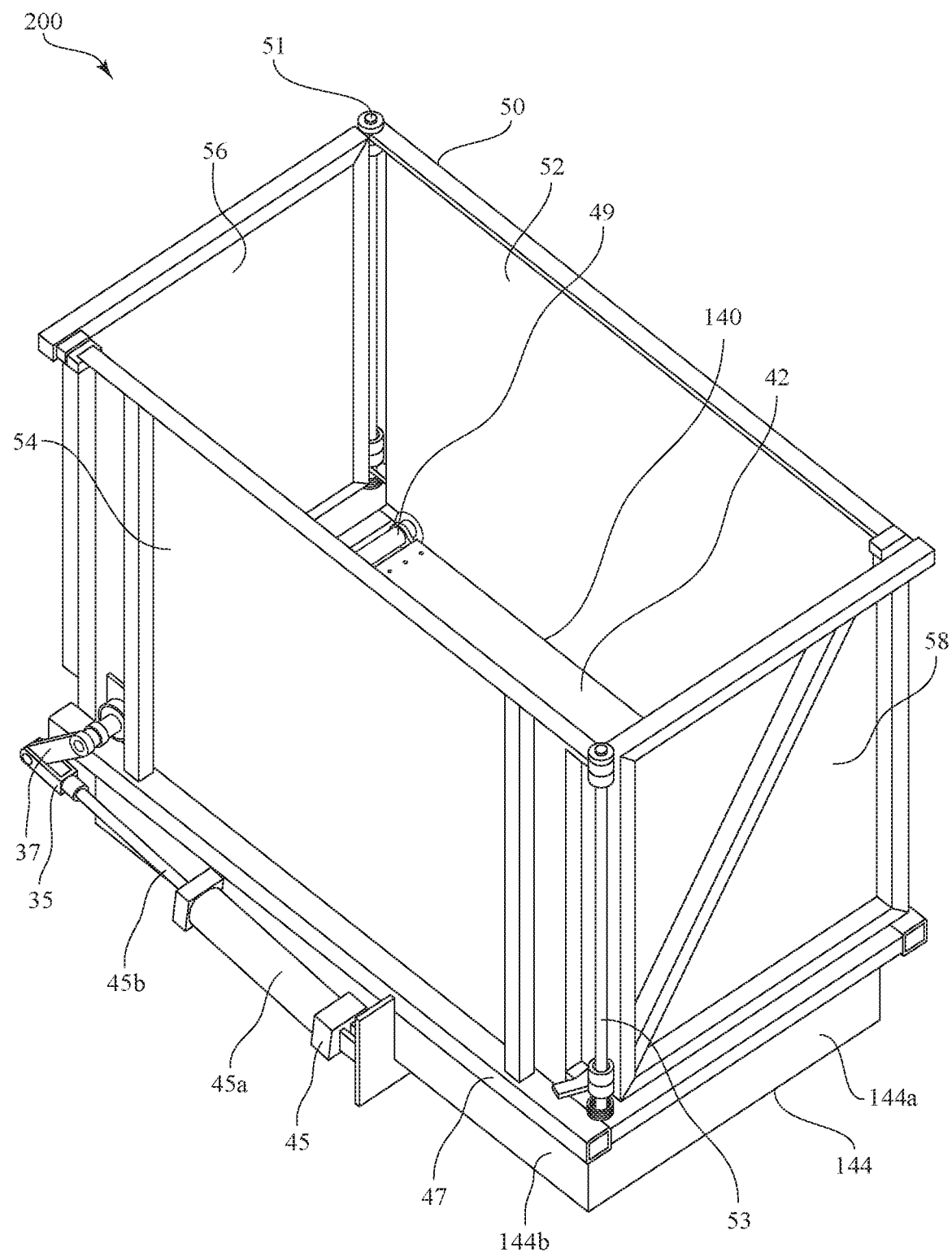
FIG. 3A is a perspective view of another exemplary rejection chute and enclosure made in accordance with the present invention, with a door of the exemplary rejection chute in a first (closed) position.
Figure 3B:
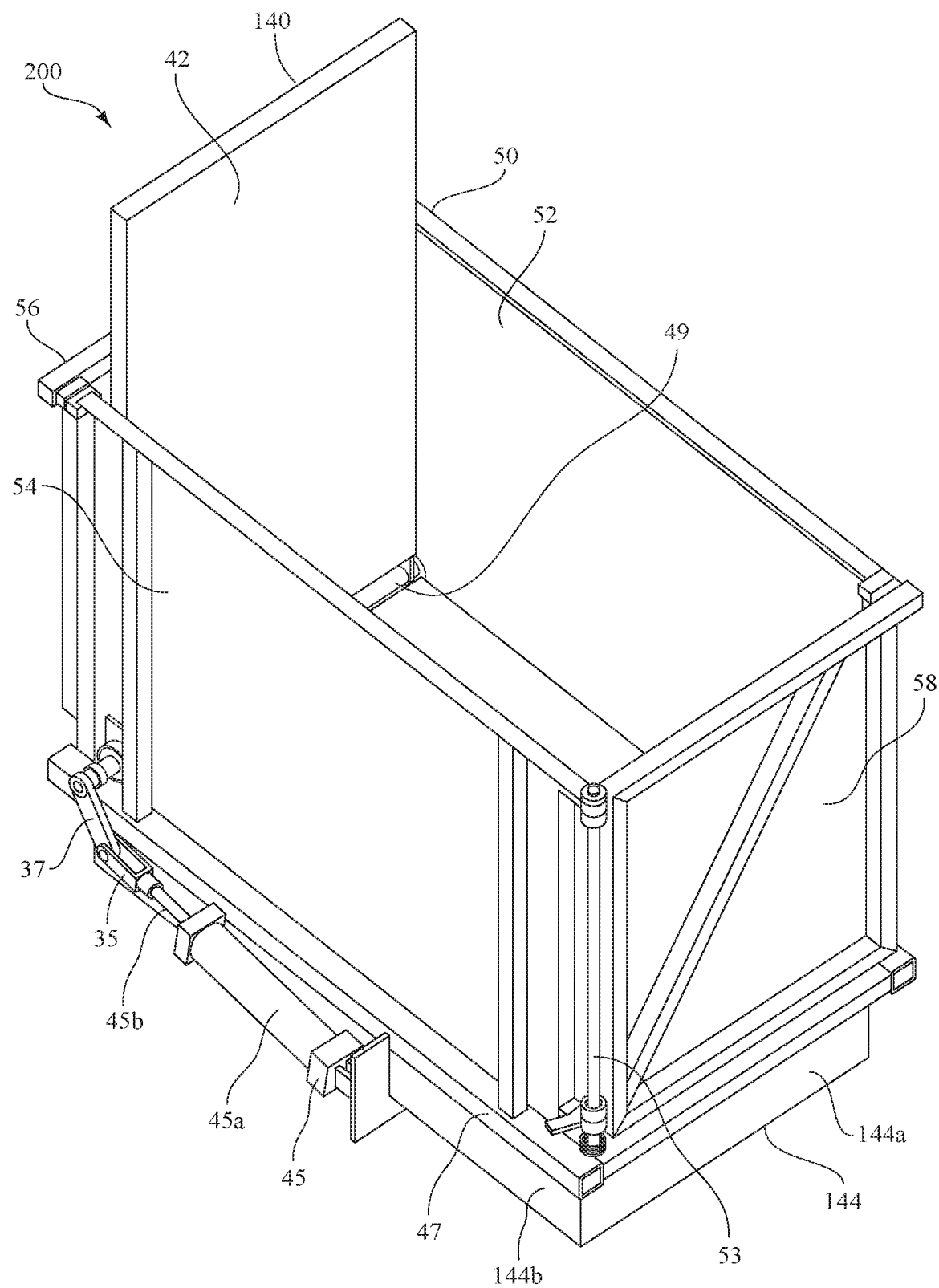
FIG. 3B is a perspective view similar to FIG. 3A, but with the door of the exemplary rejection chute in a second (open) position.

FIGS. 3A and 3B are perspective views of another exemplary assembly 200 made in accordance with the present invention, which may be utilized in place of the assembly 100 in the conveyor system 10 described above with reference to FIGS. 1A and 1B. In this exemplary embodiment, the assembly 200 includes the enclosure 50 described above with reference to FIGS. 1A and 1B and a rejection chute 140 on top of which the enclosure 50 is positioned. The rejection chute 140 in this exemplary embodiment includes each of the features of and provides the same functionality as the rejection chute 40 described above with reference to FIGS. 1A, 1B, 2A, and 2B, except that the side walls 144a, 144b (only two of which are shown in FIGS. 3A and 3B) are alternatively shaped and sized. (For brevity, structural components which are the same in both the rejection chute 40 illustrated in FIGS. 1A, 1B, 2A, and 2B and the rejection chute 140 illustrated in FIGS. 3A and 3B are identified with the same reference numerals.) Specifically, in this exemplary embodiment, each of the four side walls 144a, 144b defining the conduit 144 of the rejection chute 140 extends linearly (i.e., does not curve) and are shorter than those of the side walls 44a, 44b, 44c, 44d defining the conduit 44 of the rejection chute 40 in FIGS. 1A and 1B. As such, the assembly 200 may prove useful in applications where parcels transferred off of the first conveyor 20 and/or the second conveyor 22 only need to be directed in a single direction (i.e., vertically) or in environments where clearance below the walking surface 60 is limited.

Figure 4:
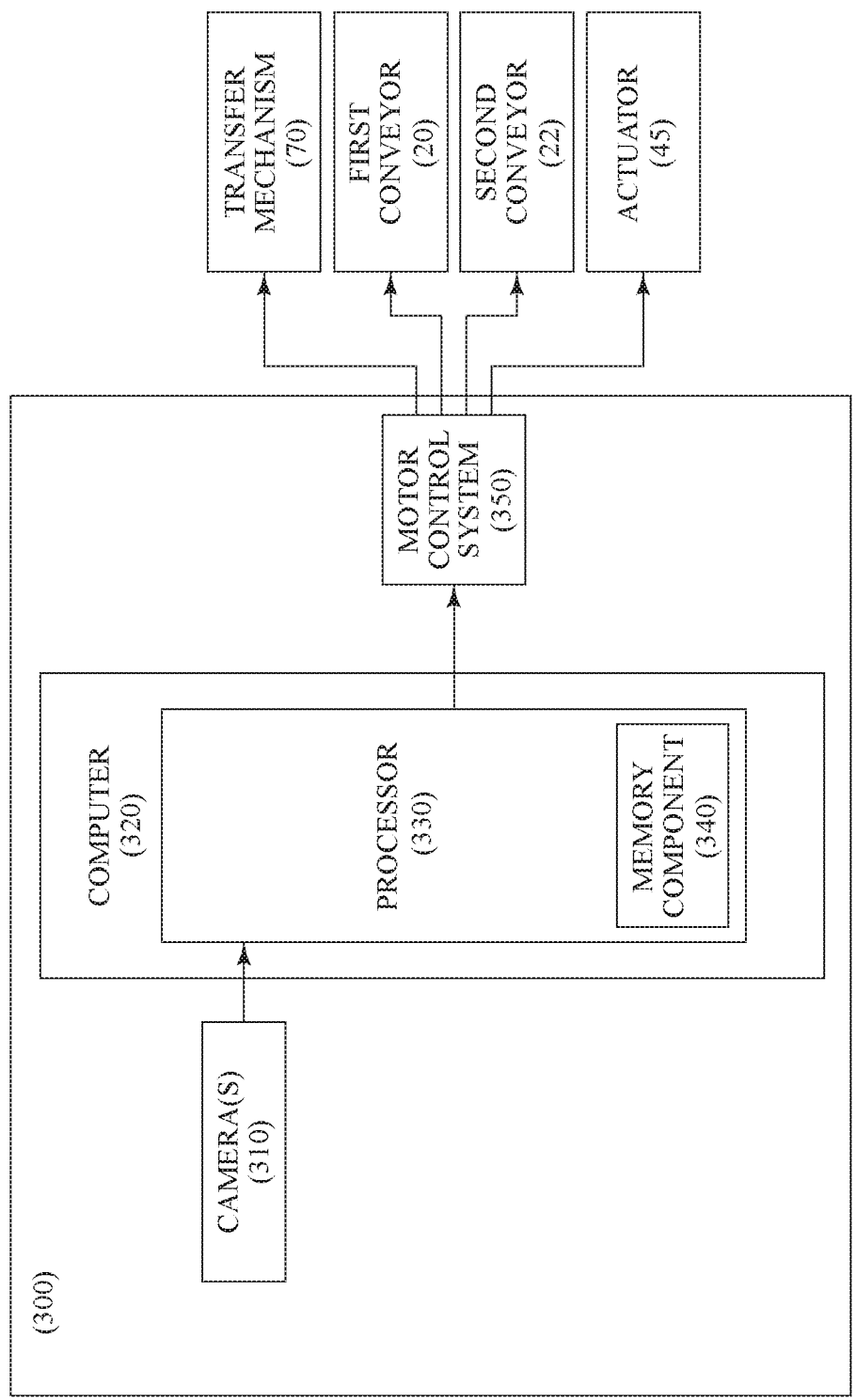
FIG. 4 is a schematic diagram of a control subsystem for a conveyor system that includes a rejection chute and enclosure made in accordance with the present invention.

FIG. 4 is a schematic diagram of a control subsystem 300, which can be utilized with the conveyor system 10 described above with respect to FIGS. 1A and 1B. As shown in FIG. 4, the control subsystem 300 includes one or more cameras 310, wherein each camera is configured to collect environmental image data regarding the parcels on the first conveyor 20 and/or the second conveyor 22 of the conveyor system 10. The control subsystem 300 preferably includes a camera 310 positioned in the vicinity of to the transfer mechanism 70 responsible for transferring parcels from the first conveyor 20 and/or the second conveyor 22 to the rejection chute 40, 140 of the conveyor system 10. The camera 310 collects two-dimensional and/or three-dimensional image data of parcels within its field of view, which is subsequently processed within the control subsystem 300 to identify which parcels exhibit a predefined characteristic (e.g., certain dimensions or shape) that signifies that the parcel is "unconveyable" and should be identified for rejection.

Referring still to FIG. 4, the control subsystem 300 further includes a computer 320 operably connected to the camera(s) 310, such that the computer 320 can receive and process image data from the camera(s) 310. In this regard, the computer 320 includes a processor 330 for executing instructions (routines) stored in a memory component 340 or other computer-readable medium. Further details about preferred imaging processing techniques are included in U.S. Pat. No. 10,646,898, which, again, is incorporated herein by reference.

Referring still to FIG. 4, the control subsystem 300 further includes a motor control system 350, which receives instructions from the computer 320 and controls operation of certain components of the conveyor system 10 that are operably connected to the motor control system 350. For example, suitable motor control systems for use in the present invention include: ControlLogix® controllers, which are part of the Allen-Bradley product line manufactured and distributed by Rockwell Automation, Inc. of Milwaukee, Wis.; and PacDrive™ controllers manufactured and distributed by Schneider Electric USA of Andover, Mass. In this exemplary implementation, the first conveyor 20, the second conveyor 22, the actuator 45 of the rejection chute 40, 140, and the mechanism 70 of the conveyor system 10 are each operably connected to the motor control system 350.

Referring now to FIGS. 1A, 1B, and 4, in some implementations, the conveyor system 10 may commence processing a bulk flow of parcels positioned on the first conveyor 20 and/or the second conveyor 22 by having the one or more cameras 310 acquire image data of the parcels on the first conveyor 20 and/or the second conveyor 22. The image data is then transmitted to and processed by the computer 320 to identify which parcels, if any, within the bulk flow exhibit a predefined characteristic which signifies that such parcel is "unconveyable" and should be identified for rejection. Upon identifying a parcel 12a for rejection, the computer 320 communicates instructions (or signals) to the motor control system 350, which, in turn, communicates instructions (or signals) to the actuator 45 of the rejection chute 40, 140 to transition the door 42 of the rejection chute 40, 140 from the first (closed) position to the second (open) position to receive the identified parcel.

Once the door 42 of the rejection chute 40, 140 is in the second (open) position, the motor control system 350 then communicates instructions to the transfer mechanism 70, which cause the transfer mechanism 70 to transfer the parcel (such as the parcel identified by reference number 12a) from its position on the first conveyor 20 and/or the second conveyor 22 to the rejection chute 40, 140. Of course, the particular manner in which the parcel 12a is moved to the rejection chute 40, 140 will vary depending on the type of transfer mechanism 70 used. For example, in embodiments where the transfer mechanism 70 is a robot singulator, the parcel 12a may be lifted from its position on the first conveyor 20 and/or the second conveyor 22, transported to a position over the rejection chute 40, 140, and then subsequently released into the rejection chute 40, 140. In other embodiments, where the transfer mechanism 70 is a rejection mechanism such as one of the rejection mechanisms described in co-pending and commonly owned U.S. patent application Ser. No. 16/887,286, which, again, is incorporated herein by reference, the parcel 12a may be pushed across the surface of first conveyor 20 and/or the surface of the second conveyor 22 and down the transfer chute 30 to the rejection chute 40, 140.

Following delivery of the parcel 12a to the rejection chute 40, 140, the motor control system 350 communicates instructions to the actuator 45 of the rejection chute 40, 140 to transition the door 42 of the rejection chute 40, 140 back to the first (closed) position. In some embodiments, based on the image data received by the camera(s) 310, the computer 320 may identify multiple parcels within the bulk flow for rejection. Thus, in some embodiments, multiple parcels may be moved to the rejection chute 40, 140 by the transfer mechanism 70 prior to the door 42 of the rejection chute 40, 140 being transitioned from the second (open) position back to the first (closed) position. Once each of the parcels identified for rejection are transferred to the rejection chute 40, 140, the computer 320 then communicates instructions to the motor control system 350 which cause the first conveyor 20 and/or the second conveyor 22 to index forward to move parcels not identified for rejection downstream for subsequent processing and/or to move parcels not reflected in the image data into the field of view of the camera(s) 310. The foregoing process can then be repeated to process the remainder of parcels within the conveyor system 10.

Although the exemplary rejection chutes 40, 140 are described above as being installed in relation to the first conveyor 20 and the second conveyor 22 in the conveyor system 10, and as being integrated within the walking surface 60 of the conveyor system 10, it should be appreciated that the use of the exemplary rejection chutes 40, 140 are not exclusively limited to this application. As noted above, within a sorting facility, there is often a complex system of conveyors and equipment that facilitates transport and sorting of the various parcels within the facility. The exemplary rejection chutes 40, 140 described herein could thus be installed and used at other points within the sorting facility; indeed, the exemplary rejection chutes 40, 140 could be installed at any location where it is desirable to redirect parcels from a higher position to a lower position.

One of ordinary skill in the art will recognize that additional embodiments and implementations are also possible without departing from the teachings of the present invention. This detailed description, and particularly the specific details of the exemplary embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A conveyor system, comprising:
    a conveyor with a conveying surface for carrying a bulk flow of parcels; and
    a rejection chute positioned adjacent to the conveyor, the rejection chute including
        a conduit defined by a plurality of side walls, the conduit including an enclosed upper portion defining a first opening for receiving parcels from the conveyor into the rejection chute and a lower portion defining a second opening for discharging parcels from the rejection chute,
        a door mounted proximate to the first opening, the door being configured to transition between a first position to cover the first opening and a second position to uncover the first opening, and
        an actuator operably connected to the door and configured to transition the door between the first position and the second position;
    wherein the rejection chute is positioned relative to a walking surface, which extends alongside the conveyor in a plane below the conveying surface of the conveyor; and
    wherein the door is positioned in substantially the same plane as the walking surface, below the conveying surface of the conveyor, when the door is in the first position, and such that parcels discharged from the rejection chute are discharged below the walking surface.

2. The conveyor system as recited in claim 1, wherein at least one side wall of the plurality of side walls defining the conduit curves as the side wall extends from the enclosed upper portion of the conduit to the lower portion of the conduit to discharge parcels from the rejection chute in a direction substantially perpendicular to the direction in which the parcels are initially received into the rejection chute.

3. The conveyor system as recited in claim 1, wherein the door is mounted to a shaft, the shaft being operably connected to the actuator and defining an axis of rotation about which the door can rotate to transition between the first position and the second position.

4. The conveyor system as recited in claim 3, and further comprising:
    a linkage assembly interconnecting the actuator and the shaft, the linkage assembly including
        a first linkage having a proximal end connected to a distal end of an arm of the actuator, and
        a second linkage having a proximal end pivotally connected to a distal end of the first linkage and a distal end connected to the shaft.

5. The conveyor system of claim 1, wherein the lower portion of the conduit is partially enclosed.

6. A conveyor system, comprising:
- a conveyor for carrying a bulk flow of parcels;
- a rejection chute positioned adjacent to the conveyor, the rejection chute including
  - a conduit defined by a plurality of side walls, the conduit including an enclosed upper portion defining a first opening for receiving parcels from the conveyor into the rejection chute and a lower portion defining a second opening for discharging parcels from the rejection chute,
  - a door mounted proximate to the first opening, the door being configured to transition between a first position to cover the first opening and a second position to uncover the first opening, and
  - an actuator operably connected to the door and configured to transition the door between the first position and the second position;
- wherein the rejection chute is positioned relative to a walking surface extending alongside the conveyor, such that the door is positioned in substantially the same plane as the walking surface when the door is in the first position, and such that parcels discharged from the rejection chute are discharged below the walking surface;
- an enclosure positioned on top of the rejection chute, the enclosure including
  - a pair of side walls spaced apart from one another and extending substantially parallel to the conveyor,
  - a first gate positioned at a first end of the enclosure between the pair of side walls of the enclosure, wherein the first gate is pivotally mounted to one of the pair of side walls, such that the first gate pivots about a substantially vertical axis between an open position providing access to a pathway over the door of the rejection chute and a closed position restricting access to the rejection chute, and
  - a second gate positioned at a second end of the enclosure between the pair of side walls of the enclosure, wherein the second gate is pivotally mounted to one of the pair of side walls, such that the second gate pivots about a substantially vertical axis between an open position providing access to the rejection chute and a closed position restricting access to the rejection chute.

7. An assembly for use with a conveyor system, comprising:
- a rejection chute, the rejection chute including
  - a conduit defined by a plurality of side walls, the conduit including an enclosed upper portion defining a first opening for receiving parcels into the rejection chute and a lower portion defining a second opening for discharging the parcels from the rejection chute,
  - a door mounted proximate to the first opening of the conduit, the door being configured to transition between a first position to cover the first opening and a second position to uncover the first opening, and
  - an actuator operably connected to the door and configured to transition the door between the first position and the second position; and
- an enclosure positioned on top of the rejection chute, the enclosure including
  - a pair of side walls spaced apart from one another and extending in parallel,
  - a first gate positioned at a first end of the enclosure between the pair of side walls of the enclosure, wherein the first gate is pivotally mounted to one of the pair of side walls, such that the first gate pivots about a substantially vertical axis between an open position
  - a second gate positioned at a second end of the enclosure between the pair of side walls of the enclosure, wherein the second gate is pivotally mounted to one of the pair of side walls, such that the second gate pivots about a substantially vertical axis between an open position providing access to the pathway over the door of the rejection chute and a closed position restricting access to the rejection chute.

8. The assembly as recited in claim 7, wherein at least one side wall of the plurality of side walls defining the conduit curves as the side wall extends from the enclosed upper portion of the conduit to the lower portion of the conduit to discharge parcels from the rejection chute in a direction substantially perpendicular to the direction in which the parcels are initially received into the rejection chute.

9. The assembly as recited in claim 7, wherein the door is mounted to a shaft, the shaft being operably connected to the actuator and defining an axis of rotation about which the door can rotate to transition between the first position and the second position.

10. The assembly as recited in claim 9, wherein the rejection chute further includes a linkage assembly interconnecting the actuator and the shaft, the linkage assembly including:
- a first linkage having a proximal end connected to a distal end of an arm of the actuator; and
- a second linkage having a proximal end pivotally connected to a distal end of the first linkage and a distal end connected to the shaft.

* * * * *

UNITED STATES PATENT AND TRADEMARK OFFICE
CERTIFICATE OF CORRECTION

| | | |
|---|---|---|
| PATENT NO. | : 11,130,634 B1 | Page 1 of 1 |
| APPLICATION NO. | : 16/913509 | |
| DATED | : September 28, 2021 | |
| INVENTOR(S) | : Nicholas A. Berg, Carl David Graston and Paul Receveur | |

It is certified that error appears in the above-identified patent and that said Letters Patent is hereby corrected as shown below:

In the Claims

Claim 1, Column 10, Line 43, replace "position, and" with "position,"

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*